United States Patent [19]
Bowden

[11] 3,976,981

[45] Aug. 24, 1976

[54] MULTI-CHANNEL CONTROL SYSTEMS

[75] Inventor: Keith Romilly Roskrudge Bowden, Bognor Regis, England

[73] Assignee: Rosemount Engineering Company Limited, Bognor Regis, England

[22] Filed: May 14, 1973

[21] Appl. No.: 360,126

Related U.S. Application Data

[63] Continuation-in-part of Ser. No. 120,170, March 2, 1971, abandoned.

[52] U.S. Cl. .......................... 340/172.5; 235/151.1
[51] Int. Cl.² ...................... G06F 3/05; G06F 9/02
[58] Field of Search .............. 340/172.5; 235/151.1; 445/1

[56] References Cited
UNITED STATES PATENTS

| | | | |
|---|---|---|---|
| 2,946,044 | 7/1960 | Bolgiano, Jr. et al. | 340/172.5 |
| 2,987,704 | 6/1961 | Gimpel et al. | 340/172.5 |
| 3,144,549 | 8/1964 | Hoberg et al. | 340/172.5 |
| 3,221,309 | 11/1965 | Benghiat | 340/172.5 |
| 3,266,023 | 8/1966 | Werme | 340/172.5 |
| 3,267,434 | 8/1966 | Clark | 340/172.5 |
| 3,374,464 | 3/1968 | Brothman | 340/172.5 |
| 3,581,289 | 5/1971 | Wilhelm | 340/172.5 |

Primary Examiner—Gareth D. Shaw
Assistant Examiner—John P. Vandenburg
Attorney, Agent, or Firm—Dugger, Johnson & Westman

[57] ABSTRACT

A control system for controlling a number of different variables in accordance with input information has a plurality of separate control channels each including a digital store, preferably a shift register, for storing input and output data and also control parameters appropriate to that channel. The channels are connected sequentially to a common data processing unit which makes use of a common algorithm store. Selection of algorithms for the various channels is effected by a pin board matrix thereby providing a visual display of the selected algorithms. An operator's console has facilities for selecting any channel and displaying information from the channel store on monitors. A key-board enables the operator to change control parameters of the selected channel. Each channel also includes means for analogue-to-digital conversion of input information, digital to analogue conversion of output information and holding means for output analogue data.

12 Claims, 9 Drawing Figures

MULTI-CHANNEL CONTROL SYSTEMS

CROSS REFERENCE TO RELATED APPLICATION

This application is a continuation-in-part of co-pending application Ser. No. 120,170 filed Mar. 2, 1971, now abandoned.

BACKGROUND OF THE INVENTION

This invention relates to controllers providing an electrical output signal in response to input signals.

Controllers are widely used for many purposes, for example in automatic process controls for manufacturing or chemical operations. Such controllers are usually employed in conjunction with transducers which sense the magnitudes of parameters relating to the operation to be controlled and which provide electrical signals fed to the controller. The controller processes these signals and provides electrical output signals for control purposes. The present invention is concerned with a controller having a number of information inputs and providing outputs for effecting a number of control operations. In the controller of the present invention, processing is effected digitally on a time-shared basis. Apart from the time-shared operation of the digital processing equipment, the control operations may be independent in the sense that input information from one source may be processed and used to provide an output signal independently of any other input information. It is thus convenient to refer to "control channels", a channel being concerned with taking input information for feeding to the processor and providing a corresponding processed output signal. Reference may be made to U.S. Pat. No. 3,374,464 and 3,267,434 as examples of prior multi-channel control system using digital data processing.

In prior types of multi-channel control systems using digital data processing, the programming of the data processing part of the equipment has been a complex job requiring special training and experience. It is a principal object of the present invention to provide an improved form of multi-channel controller in which the setting up of the algorithms for processing the information for the various channels is simply and readily done and in which the selected algorithms are visually displayed.

Although on one channel incoming information may be processed to provide an output, inter-connection of channels may be required for various purposes, e.g. input information may be used in more than one channel or output information from one channel may be used as an input in another channel. As explained later such interconnection may be provided and visually displayed in the controller of the present invention. It is convenient however in the first place to consider the equipment as having a number of control channels which can be operated independently on a time-shared basis utilising commondata processing equipment.

SUMMARY OF THE INVENTION

According to the present invention, in a control system having a number of control channels there is provided a common data processing unit for processing data in digital form, and a plurality of separate control channels, each channel having a digital store for storing input information, output information and other data relevant to that channel, sequencing means for sequentially connecting the data processing unit to the stores associated with the various channels, an algorithm store for providing instructions to the data processing unit for appropriately processing the input data on the selected channel and feeding the processed input data to the output store of that channel, and a channel specification store comprising a matrix having data storage, manual entry and visual display, means connecting said channel specification store to said processing unit to provide the processing unit with predetermined information for the various channels, and sequencing means scanning said matrix in step with the sequential scanning of the various channels.

The matrix in the channel specification store is conveniently a pin-board matrix. This enables the selection of the required algorithms to be effected manually and gives a visual display of the entered information. This provides a simple convenient means by which the operator can programme the system so as to give the required functions. By the use of the patch cords, it is possible to make interconnections on the matrix, so as to feed information on one channel into another channel.

Heretofore, in multi channel control systems, it has been the practice either to have a fixed program determining the operation of the system modifiable only by reprogramming or to make use of a teletypewriter for putting in program instructions. The fixed programs are usually modifiable by means of a paper tape or magnetic tape input and any change in such a program usually requires the services of a computer programmer and cannot be effected by a control engineer in a process control plant. The teletypewriter enables programs to be changed but requires the use of relatively complex coding schemes which must be learned by the operator before any program change can be effected.

The arrangement of the present invention provides a simple system which can readily be used by a control engineer since the possible functions are visually displayed and selection can be effected by insertion of pins in appropriate sockets in the matrix.

Typically the system might be arranged to handle up to say a hundred channels dealing with each periodically as required. It would be readily possible to process the data in a hundred channels in less than 1 second but, as will be explained later, it is often desirable to process data at longer time intervals than this in order that significant changes in input information can be sensed and utilised to provide information about the rate of change. The sequencing means preferably therefore is adjustable or can be preset to connect the various channels to the data processing unit at time intervals selected to be appropriate for the individual channels.

Each channel is basically equivalent to a single loop controller. For each channel, the input signals may be analogue signals, typically a current input. A current input in any predetermined current range may be converted by an appropriate terminating resistor so as to produce a signal in a standard voltage range e.g. 1 to 5 volts. The voltage signals may be scanned by switches, for example field effect transistor switches, controlled by the channel sequencing system and presented in turn to a high speed analogue-to-digital converter. The resultant digital signal is then put into the input data store for the appropriate channel. Alternatively each channel may have a separate analogue-to-digital converter for feeding the input analogue information into the input data store in digital form.

The output store of a channel has information in digital form which may be converted into analogue form e.g. a current output. This digital-to-analogue conversion is conveniently effected by converting the digital signal to a pulse train and then smoothing the pulse train with an averaging circuit. The digital to pulse train conversion may be effected as described in the specification of U.S. Pat. No. 3,605,026 of K. R. R. Bowden filed 14th July 1969 and entitled "Apparatus for providing a pulse train having a mean frequency proportional to a digital number". The conversion, as described in that specification, is effected by cycling a number in a shift register in such a way as to present each bit of the number, at the output of the shift register, for a proportion of the time in accordance with the significance of the bit. The instantaneous output of the shift register is then smoothed to generate a D.C. voltage proportional to the number in the shift register and this voltage in turn is converted into the required current output signal. The shift pulse train required for such a digital analogue conversion is complex but one pulse generator may be used to provide the shift trains for any number of such digital-to-analogue converters.

If a shift register is used for the digital-to-analogue conversion of the output of a channel, it is convenient to use a single shift register for each channel to store not only the output information but also the input information and other data required during the processing for that channel. The shift pulse generator is then arranged so that only the output number stops at the end of the register; data transfers in and out of the register are done as the numbers go past in the course of their normal cycling, using synchronising information from the shift pulse generator.

The digital data processing unit processes the input information using algorithms from the algorithm store as directed by a channel specification store. The algorithm store preferably contains algorithms to provide for all normal control facilities such as three-term control with cascade control of set point and feed forward, ratio control, and a general lead/lag/gain/limiting algorithm. The control data to be used with the algorithms, e.g. set-point values, integral and derivative time constants e.g., are preferably entered and stored in the stores for the various channels as described later.

Monitoring facilities may be provided for monitoring the input and output information in the input and output data stores. Manual control facilities may also be provided.

The monitoring facilities may include manually operable selector means to select a channel and visual display means displaying the input and output information in the selected channel store. Preferably manually operable means are provided for monitoring and inputting set-point and/or other control information into the selected channel store. For this purpose a numerical keyboard information entry means may be provided.

Additionally a digital interface may be provided via which other devices may be connected. For example a computer could be attached in a supervisory mode for adjusting set-points, time constants etc., or it could take over direct control of some channels either permanently or temporarily. A set-point sequencer may be provided to change any or all of the set-points or other constants according to a prearranged sequence to assist with start-up or other rapidly changing conditions.

For each channel there may be provided a fixed store for providing fixed information. Physically these fixed stores may be located together; they may be arranged for setting by the user. For example, the fixed stores for all the channels may comprise a single diode pin-board matrix constituting the aforementioned channel specification store. This matrix may be scanned in step with the sequential scanning of the various channels. Such a pin-board matrix may have a row (or column) of sockets for each channel. These are preferably arranged so that the required function (e.g. the required algorithm) for each channel is selected by putting pins in appropriately labelled sockets or by putting appropriately labelled multi-contact pins in a socket. For example, there might be "proportional", "integral" and "derivative" sockets, pins being put in all three if three-term control is required or in only one or two if only one or two term control is required. Alternatively, a single multi-contact (e.g. four contact) socket may be provided into which an appropriate pin is inserted according to the type of control required. Similarly further sockets may be provided to select other functions such as alarm operation or sampling interval. Patch cords may be used on such a pin-board matrix for inter-channel connections. e.g. to define a connection from the output of one channel to the input of another.

Conveniently an intermediate register is employed associated with the data processing unit, the complete information from the data stores associated with each channel being transferred to the intermediate register in sequence when the data from that channel is to be processed. The data processing unit can utilise this register and a small amount of working storage to perform the required processing; at the end of the processing, the required output together with other quantities to be remembered, such as the value of the integral term in a three-term control channel are put into the appropriate positions in the intermediate register. At a last stage in dealing with a channel, the new contents of the intermediate register are transferred to the appropriate channel data store.

Preferably "hold" facilities are provided on the output of each channel, for example by applying the output voltage to a capacitor connected in the input of a voltage to current converter powered from a battery backed-up power supply. Manual back-up raise/lower facilities may be provided for manual change of the output. The operator's console may have a switch for switching all the channels onto the hold facility so as to isolate and maintain the output signal in case of equipment failure. Automatic means may be provided for operating this switch from fault-detection circuits. Critical control loops may have individual analogue backup controllers incorporated in the channel input/output circuits, brought into operation manually or automatically as required.

DESCRIPTION OF THE PREFERRED EMBODIMENTS

Figure 1:
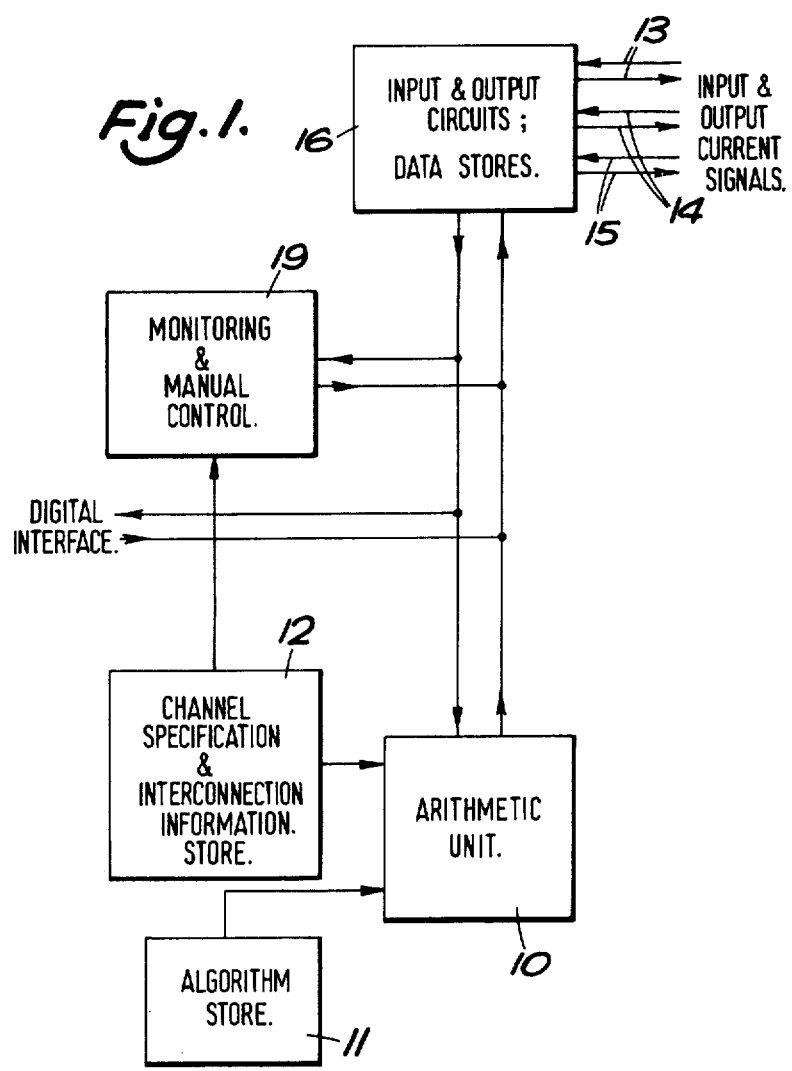
FIG. 1 is a basic block diagram of a controller embodying the invention.

Referring to FIG. 1 there is shown an arithmetic unit 10 with an algorithm store 11 and a channel selector 12 for effecting sequential selection of the channels. As previously indicated, there may be a large number of channels, e.g. a hundred channels. Each provides input information for processing and provides output control signals or possible output signals for feeding to other channels. These channels are indicated diagrammatically by the three pairs of leads 13, 14, 15 each pair comprising an input and an output. The input and output circuits are represented by the block 16 which includes analogue-to-digital converters for the input information digital-to-analogue converters for the output information and a data store for each channel. This data store is typically a separate 100-bit shift register for each channel. This shift register may be used, as previously explained, for the digital-to-analogue conversion as well as for storing input data, output data and data required for the particular channel. An operator's console shown in FIG. 3 and to be described in further detail later has monitoring and manual control facilities indicated in FIG. 1 diagrammatically at 19, these serving to display input data and output control data and also the set-point. Conveniently, the operator has a channel selector, e.g. push-buttons, so that he can select any one channel and only information about that channel is displayed. The operator has facilities for altering set-points and other information, including direct manual control of any output. Information to be entered is set in by a keyboard and is displayed for checking before being transferred into the control system. The operator also has "hold" facilities previously described. The construction and use of operator's consoles in control system is well known and reference may be made, for example, to "Instrument Engineers' Handbook" edited by Bela G. Liptak, Chilton Book Co. Phila. 1970, Pages 1091–1095 for a description of a typical console construction.

Figure 2:
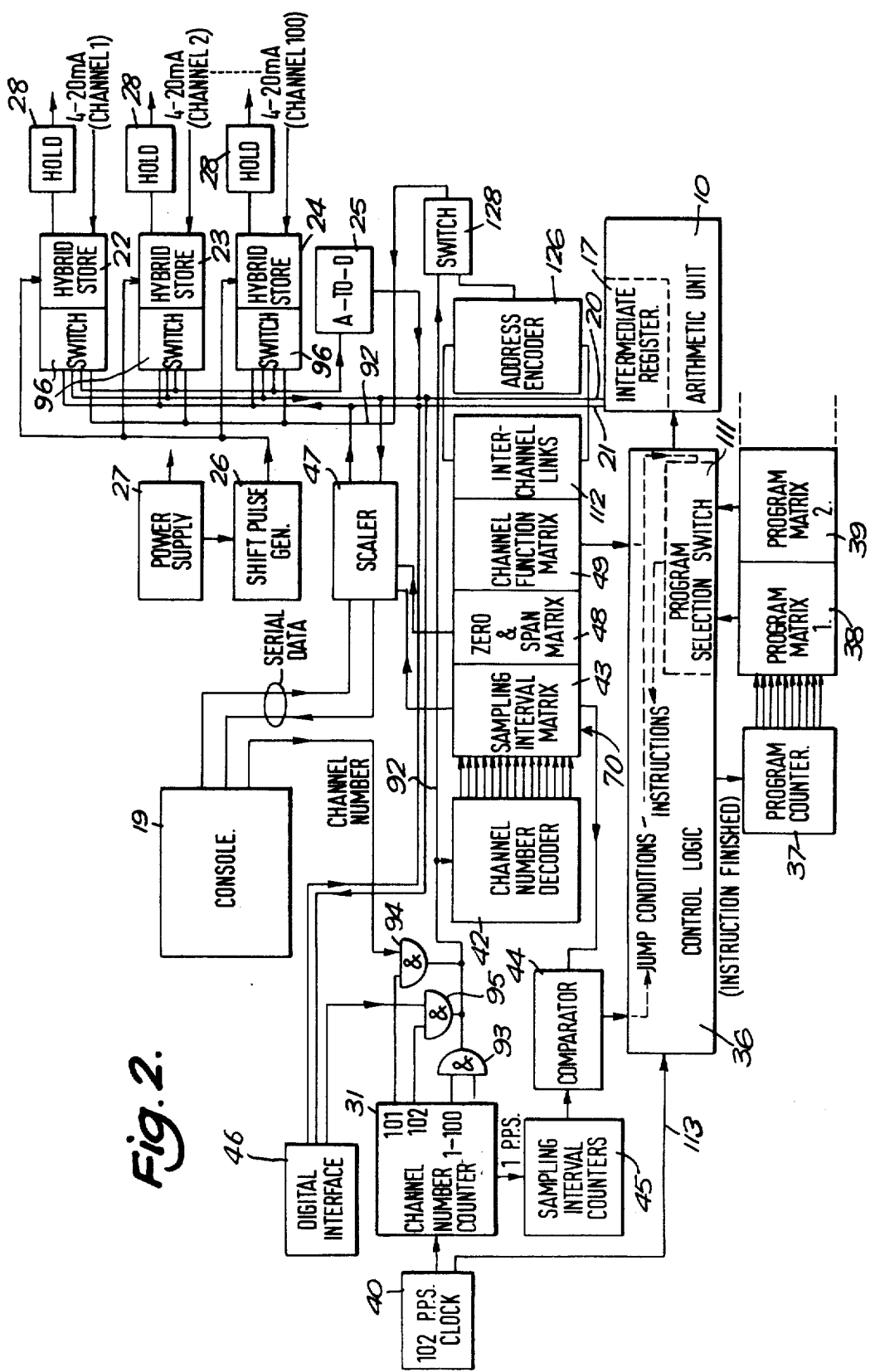
FIG. 2 shows the controller of FIG. 1 in further detail.

Referring now to FIG. 2, the controller is shown in more detail. The arithmetic unit 10 is connected by a highway indicated by 20, 21 to the channel data stores, or hybrid stores, of which three are shown diagrammatically at 22, 23 and 24. These stores each comprise a shift register for storing digital data. At any time, the particular hybrid store to be connected to the data highway 20, 21 is selected by the channel number highway 92. The source of the channel number on this highway 92 is normally the channel number counter 31, but, during allocated intervals in each second, as hereinafter described the console and digital interface each have an opportunity to select a channel.

Each channel data store (alternatively referred to as a hybrid store because of its involvement in the digital-to-analogue conversion) may have an associated analogue-to-digital converter for converting input information in analogue form into digital data to be put into the shift register as described later with reference to FIG. 9. In the arrangement illustrated in FIG. 2, however, there is a single analogue-to-digital converter as shown at 25. Analogue-to-digital converters are well known and reference may be made to the aforementioned "Instrument Engineers' Handbook" pages 967–970 for a description of suitable high speed converters. In the present embodiment with a single converter, sequential switching means are provided to switch the various analogue inputs to the converter and to switch the digital output from the converter on to the data highway. This sequential switching is controlled by the channel number information on the channel number highway 92. At any one time, there can only be one number on this highway and each hybrid store 22, 23 etc. contains switch means 96 responsive to the appropriate channel number to connect the hybrid store to the highway 20, 21 and converter 25. Input signals on the various channels are typically currents from remote transducers. Each input current is fed through a resistor to produce a voltage signal in a predetermined range, e.g. 1 to 5 volts. The voltage signals in the various channels are scanned sequentially under the control of the channel number on lead 92 and the selected voltage is passed to the analogue-to-digital converter 25 where it is smoothed with a suitable time-constant to remove any high-frequency interference. The analogue-to-digital conversion conveniently utilises a ladder network arrangement with switches controlled by flip-flops of a register so that the digital output number is built up bit-by-bit, with the most significant bit first, by a series of trials and comparisons. Thereafter the resultant number is shifted serially out of the register when required. Each channel also includes means for converting output digital data into analogue form. For this purpose there is provided a shift pulse generator 26 which generates shift pulses (as is described in the aforementioned U.S. Pat. No. 3,605,026 of Bowden filed July 14th 1969 and entitled "Apparatus for Providing a Pulse Train having a mean frequency proportional to a digital number") to bring each digit of the number to be converted into an output stage of the shift register for periods of time corresponding to the significance of the bit. The instantaneous output voltage is then smoothed to generate a D.C. voltage proportional to the output information in the shift register and this voltage is in turn converted into the required current output signal. The digital-to-analogue conversion has a battery backed-up power supply 27 and hold facilities 28 are provided on each output for automatically holding the output analogue voltage so that it is maintained in the event of a failure of the main power supply or any part of the controller.

The arithmetic unit 10 may typically comprise a serial adder, an accumulator register and two working registers. It is convenient however also to have an intermediate register 17, data from a channel store required by the arithmetic unit being first transferred down the data highway 20 to the intermediate register 17 in the arithmetic unit. The arithmetic unit has access to any part of the intermediate register 17 individually.

Before describing the equipment in detail, it is convenient to refer to the principal components and to outline their function. Scanning of the instruments in the program algorithm store is effected via control logic 36 which feeds a program counter 37 and accepts information from two program matrices 38, 39. Sequencing of the channels is controlled by a clock unit 40 which directly controls the aforementioned channel number counter 31. The output of the channel number counter 31 is fed into a channel number decoder 42 which drives the channel specification matrix 43, 48, 49 and 112. The output from the sampling interval part 43 of this matrix is applied to a compartment 44 which is compared with the output from a sampling intervals counter 45. With a system having a hundred channels, the channel number counter might be stepped on by one unit every 10 m secs. The sampling intervals counter 45 in this case would be stepped on each second, i.e. after a complete sequence from the channel number counter so as to give the appropriate control signals to the control logic. The sampling interval matrix 43 has to provide, as described below, outputs indicating in which of the scanning sequences each channel is to be sampled. Matrix 43 also feeds a scaler 47 in which this information together with information from a zero and span matrix 48 is used to provide the appropriate displays for the operator's console. The arithmetic unit 10 performs calculations in terms of 0 to 100% of the input signal and therefore does not require information from the zero and span matrix.

Figure 5:
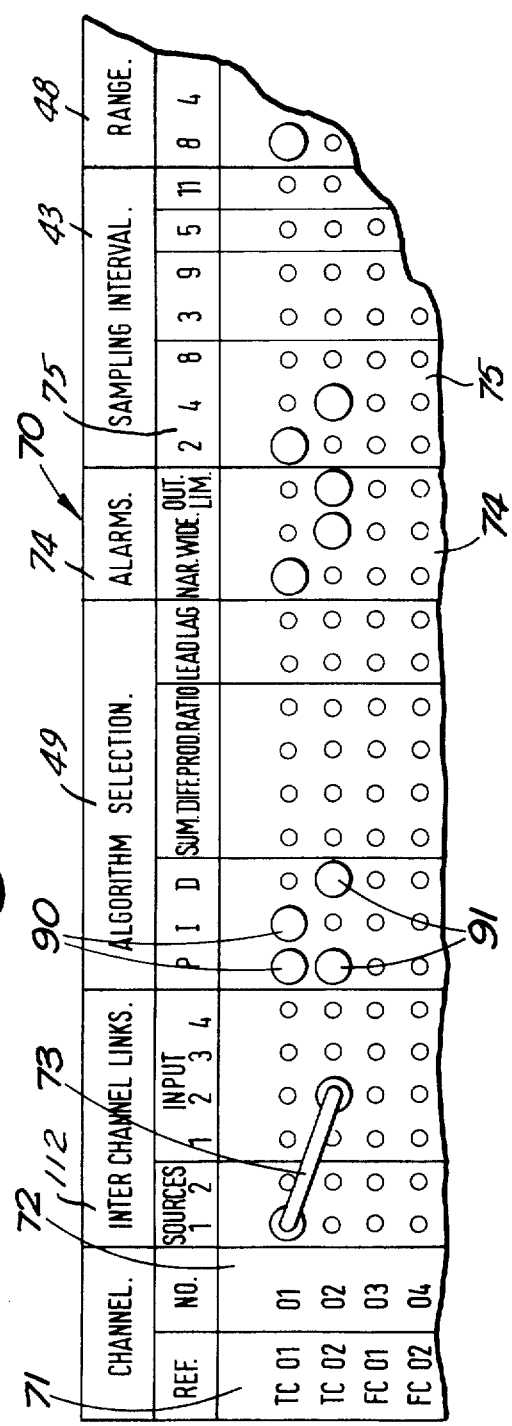
FIG. 5 is a diagram showing part of a pin-board matrix used in the controller of FIG. 1 and illustrating how it is set-up to provide the control loop of FIG. 4.

The channel specification store 12 of FIG. 1 includes as shown in FIG. 2, the sampling interval matrix 43, the zero and span matrix 48, and a channel function matrix 49 which is a diode plug-in pin-board to enable the user to specify the nature of each channel and any interconnections between channels. This pin-board matrix, which will be described later with reference to FIG. 5, is not used to define a numerical constant for the channel. It has however to indicate which of the algorithms provided is to be used for each channel and it therefore is employed directly to gate out one or other of the algorithm stores 38, 39 to the arithmetic control logic 36. It also defines in detail which parts of the chosen algorithm are actually to be used. It may for example select proportional plus integral control with feed forward from a generalised three-term control algorithm. The channel function matrix also defines interchannel connections. This enables cascaded set-points and feed forward terms to be used as well as interconnections for inter-active control. The pin-board 112 forming the matrix 49, as will be described later, has output sockets and input sockets; jumper wires are provided for connecting output sockets and input sockets when an input for one channel is to be taken from an output of another channel. The zero and span matrix 48 is also driven from the channel number decoder 42 and provides scaling information which is required for monitoring. The channel number decoder 42 also drives the sampling interval matrix 43 which allows the user to specify the sampling interval for each channel according to its requirements. This sampling interval matrix may also be in the form of a diode plug-in board. This matrix 43 is provided because, as explained below, often it may be required not to deal with all the channels in sequence.

Turning now to a more detailed consideration, the channel scanning system is based on a 102 pps clock 40, which drives the channel number counter 31. This counter has 102 different states, each of which persists for about 10 ms, until a further clock pulse is received. 100 of these states are real channel numbers, and are sent out in binary-coded-decimal form on to an 8-wire parallel channel number highway 92, via a gate 93. During these intervals, the control action of the system is accomplished, as described later. While the channel number counter is in its 101st state, the operator-selected channel number from the console 19 is connected to the channel number highway 92 via a gate 94, and a scaler 47 is activated, passing the required data between the console 19 and the operator-selected channel date store. While the channel number counter 31 is in its 102nd state, a digital interface 46 is allowed to specify a channel number via a gate 95, and to pass information to and from the selected channel data store via the data highway 20, 21. This digital interface is utilised for the attachment of other digital equipment.

As well as selecting a particular channel data store for connection to the data highway 20, 21 by conventional address decoding techniques, the channel number highway 92 also feeds the channel number decoder 42. Decoders suitable for this purpose are widely used and are available commercially; as a typical example reference may be made to Cambridge Thermionic Corporation decoders 780–2019 and 780–2024. This decoder 42 duplicates the effect of the individual address-decoders associated with the channel data (hybrid) stores 22, 23 and 24, decoding the 8-bit binary coded-decimal channel number into 100 individual energizing signals for the channel specification stores, which comprise the sampling interval matrix 43, the zero and span matrix 48, channel function matrix 49 and interchannel link section 112.

The channel specification stores 43, 48, 49 and 112 comprise pin-board matrices, that is to say, they have conventional X-Y conductor arrays with facilities for making a connection, via a diode, between the X-conductor and the Y-conductor at any crossing point. Pin board matrices in themselves are well known and reference may be made to U.S. Pat. Nos. 3,027,534 and 3,145,329 for a description of such devices. Conveniently, the diode is mounted in a small plug or "pin" and the array is constructed so that each crossing-point forms a socket into which a diode plug can be inserted. In the embodiment of the present invention being described, there are up to 100 X-conductors, each energized by the channel number decoder 42 when the channel number highway carries its corresponding channel number. The Y-conductors, which form the outputs of the stores, are therefore energized via any diodes which are present along the particular X-conductor being driven at the time. In this application, the presence of a diode pin in a particular column (Y-conductor) in the channel function matrix 49 is used to indicate a requirement in the control function to be applied, for example that "proportional", or "integral" action is required (see later description of the use of the matrix); in the zero and span matrix 48 it is used to give details of the scaling requirements for a particular channel's measured input signal, and in the sampling interval matrix 43, it is used to specify the required sampling interval for control action in the channel.

Thus, when any channel has been selected by the presence of its address (channel number) on the channel number highway, the channel number decoder 42 and channel specification stores 43, 48 49 and 112 act to make available on the store outputs all the necessary command signals specific to that particular channel, defining the function of the channel in an overall sense. The manner in which the commands are implemented differs in the three cases, and is described below.

Consider first the sampling interval matrix 43, whose purpose is to specify how often the control action should occur for each channel separately. The reason for this requirement is that the derivative time constant must not be more than a few times larger than the sampling interval if the effects of noise on a measured input are not to be significant, bearing in mind that the change in the input has to be measured each sampling interval. Thus, if the controlled process has long time constants, it may be desirable to have relatively long sampling intervals, possibly of many minutes, for some channels. The seven outputs of the matrix 43 for a selected channel are compared at comparator 44 with signals derived from seven counters forming the sampling interval counters 45, and when total identity is found, the comparator 44 gives an output signal to the control logic 36 instructing that control action is required for the selected channel.

Figure 6:
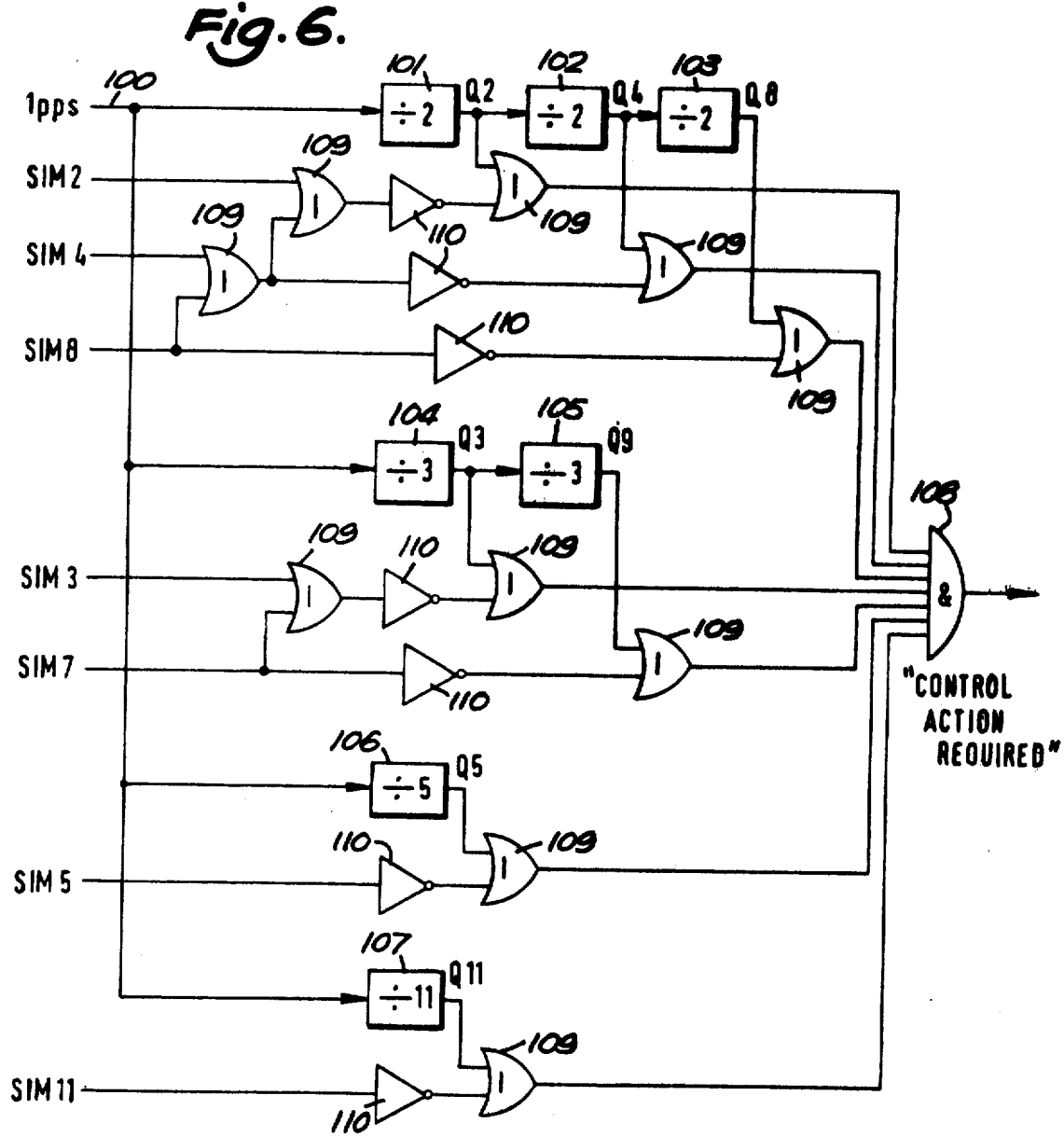
FIG. 6 is a logic circuit diagram showing the arrangement of the sampling interval counters and comparators.
Figure 7:
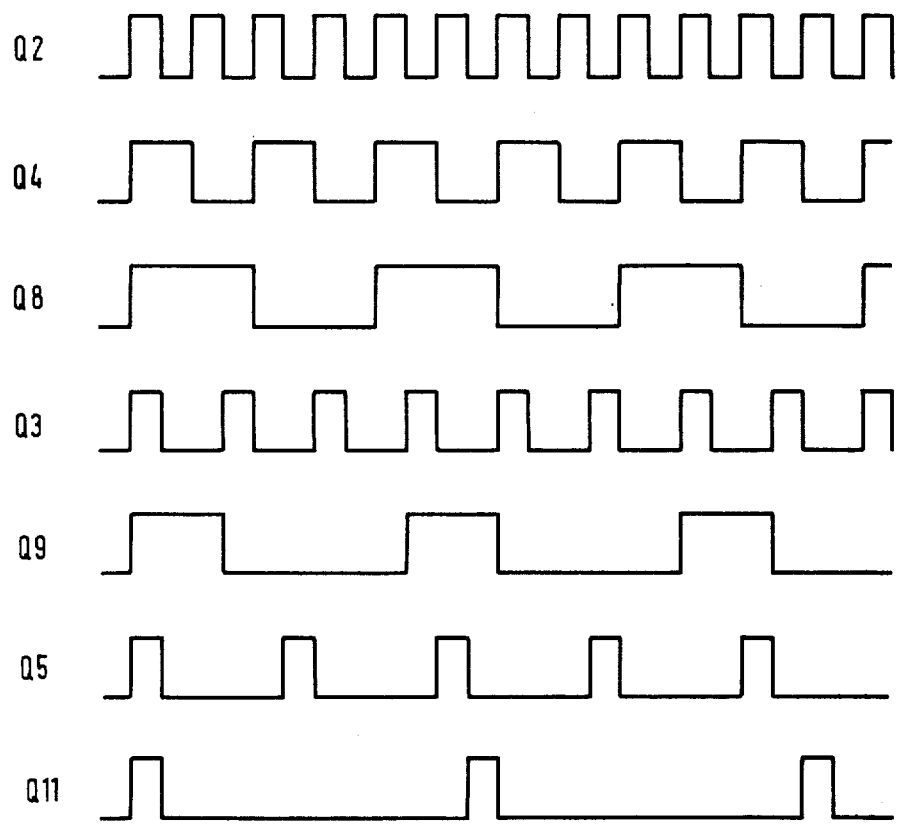
FIG. 7 is a diagram showing typical waveforms in the circuit of FIG. 6.

The logic and waveforms of the sampling interval counters and comparator are shown in FIGS. 6 and 7, in which the input signals SIM 2 to SIM 11 are the sampling interval matrix outputs. Referring to FIG. 6, an input clock signal of a frequency 1 p.p.s. is applied on an input lead 100 to a first divider chain comprising divide-by-two stages 101, 102, 103, to give outputs $Q_2$ $Q_4$ $Q_8$ at 0.5, 0.25 and 0.125 pps. The clock signal is applied to a second divider chain comprising divide-by-3 stages 104, 105 to give outputs $Q_3$ and $Q_9$ of 1/3 and 1/9 p.p.s. Furthermore the clock output is applied to a divide by 5 unit 106 and a divide by 11 unit 107 to give outputs $Q_5$ at 0.2 p.p.s. and Q11 at 1/11 p.p.s. By applying control inputs from the sampling interval matrix 43, as selected by diode pins in the matrix pinboard, in the form of continuous voltage signals on appropriate leads SIM2, SIM4, SIM8, SIM3, SIM9, SIM5, and SIM 11 any single output $Q_2$ $Q_4$ $Q_8$ $Q_9$ $Q_5$ or $Q_{11}$ or any combination of these outputs is applied to an AND gate 108 making use of a simple logic circuit comprising OR gates 109 and inverters 110. If two signals, e.g. $Q_3$ and $Q_4$ are fed to the AND gate 108, an output signal is then produced, and the sampling frequency, i.e. when coincidence of these signals occurs is 1/3 × 1/4 = 1/12 p.p.s. for the channel selected. This output indicates that control action is required for the selected channel every 12 seconds. The various waveforms are shown in FIG. 7. An example of output signal is shown in the bottom line of FIG. 7 for SIM 3 and SIM 4 active, i.e. for a sampling interval of 3 × 4 = 12 seconds. For other sampling intervals, diode pins are inserted in matrix 43 accordingly, such that when the column labels of the sampling interval portion of the matrix pinboard (see FIG. 5) are multiplied together, they give the required intervals for each of the selected control channels. Note that, with the circuit shown in FIG. 6, only one pin can be used in each of the groups of sockets, for any one channel. Note also that although the sampling interval counters 45 are only stepped on once per second, the sampling interval matric 43 outputs change as the channel scanning proceeds, so that the "control action required" signal produced by comparator 44 (FIG. 6) is representative of each channel, as it is scanned. An advantage of this scheme is that a wide range of sampling intervals is available, without the use of an individual counter for each channel.

The zero and span matrix 48 of the channel specification stores has Y-conductor outputs which feed information (conveniently in binary-coded-decimal form) to the scaler 47. The two quantities specified by the coded matrix output are the zero (i.e. low end) and span of the input signal range (typically 4 to 20 mA) in terms of the units of the physical measurement involved. For example, a transducer producing 4 to 20mA for temperatures of 300° to 500° C needs a zero of 300 and a span of 200 specified, for correct scaling into engineering units for display on the console. The two numbers from matrix 48 are used in the scaler as a multiplying factor (the span) and an additional term (the zero) in converting the internal number range (0 to 1) into engineering units for display. A conventional frequency-counting scaler, with dividers controlled by the required multiplying factors, can be implemented in this scheme, and can be made reversible as is necessary for proper scaling of newly-entered values from the console to the internal number range.

The scaling for display of both measured input and set-point for each control channel makes use of the same range factors. However, in scaling the controller time-constants (integral and derivative) for display, the sampling interval is used instead, as a scale factor, since internally, the ratio of time constant to sampling interval is stored (in the channel data stores 22, 23, 24) and used by the control algorithm. Thus, in FIG. 2, the outputs of the sampling interval matrix 43 also feed the scaler 47, and are allowed to control the scaling dividers when appropriate.

The channel function matrix portion 49 of the channel specification stores has Y-conductor outputs which feed the control logic 36 directly, to define the function of each channel in accordance with the selected diode positions on the matrix pinboard for each channel. To see how these signals are used, the functioning of the control logic 36 must be considered, in relation to the program counter 37 and program stores 38, 39, and the arithmetic unit 10. These five blocks form a simple computer, with numerical data input and output via the data highway 20, 21 and with command inputs from the comparator 44 and the channel function matrix 49. For any particular channel, the appropriate fixed program selected from the program stores by the diode pin positions in the pin matrix 49 is obeyed, step-by-step, in the conventional manner, and is completed in less than 10ms, so as to be ready for the scan to proceed to the next channel. Programs or algorithms appropriate to the various major functions to be provided for use by the controller are stored in the program stores, or matrices 38, 39, of which there may conveniently be one program for each major function type, e.g. one for "PID" control, one for "Sum, Difference, Product, Ratio" functions, one for "Lead-Lag" function, etc. Then, the presence of a channel function matrix output on the Y-conductors of matrix portion 49 of the channel specification matrix (due to a diode pin in a particular "algorithm selection" area, see FIG. 5) can be used directly by a program selection switch 111 within control logic 36 to select the related program, or algorithm, stored at the location indicated by the Y-conductor output of matrix 49. The outputs of program stores 38, 39 so selected (typically 12 to 16 bits for a simple instruction code) are fed into the control logic for use in processing the data input on the selected channel. The program matrices 38, 39 can be any form of store, but are conveniently of a "read-only" type, since the facility for program changing is not required. Typically, a diode matrix (wired, not pluggable) or an integrated-circuit "read-only memory" may be used to provide the fixed algorithms.

The selected program for the channel under consideration is obeyed, step-by-step, by the control logic/arithmetic unit combination. The control logic converts the bit pattern of the selected program instruction into gate-controlling signals for the arithmetic unit, such that the numerical input data received on data highway 20 is processed appropriately. When each instruction is finished, the control logic steps the program counter 37 on to the next instruction, which is then obeyed in its turn. At the end of the program for the selected channel, the control logic waits for a "start again" signal on a lead 113 from the 102 pps clock 40, at which time the process is repeated for the next channel.

The output of comparator 44 and the individual outputs from the channel function matrix 49, are brought into the control logic and are each addressable by program instructions to control conditional jumps, that is, jumps in the program, or to omit certain sections of a program, if the output signal is in a 0 condition. Thus, for example, if the comparator output is 0 for a selected channel, the whole of the control program is omitted (because it is not yet a sampling time for the channel); on the other hand, if the comparator output is 1, the program continues, and various sections of the selected program are brought into use, or omitted, depending on the presence or absence of pins in the channel function matrix columns, so as to give the desired total function for the channel.

Figure 3:
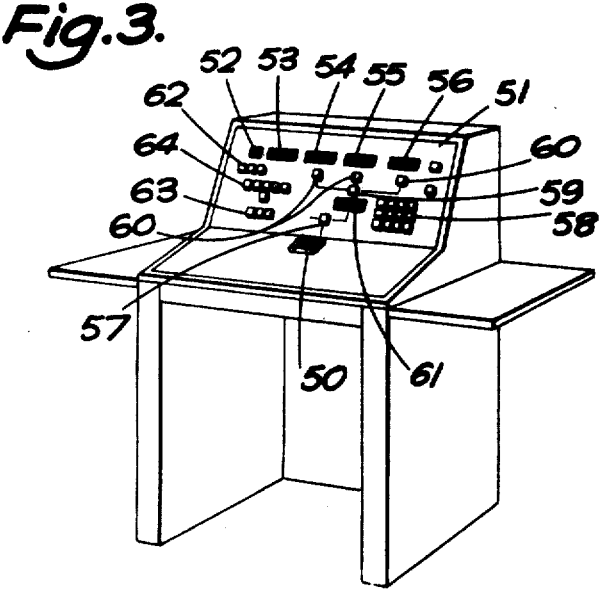
FIG. 3 illustrates diagrammatically in operator's console for the controller of FIG. 1.

FIG. 3 illustrates the operator's console. This console is of conventional construction and has a set of keys 50 for entering numerical information, these keys being conveniently located on a desk top. The console includes means for converting the keyed numbers into binary coded decimal digital form. The console has a display unit 51 containing also further keys as well as numerical visual displays. At the top of the display unit are a series of visual displays comprising channel number display 52, measured input display 53, set-point display 54, an output display 55 and an extra monitor display 56. The operator can select a channel for monitoring and for inputting of control data by keying the number on the keys 50, operating a switch 57 to effect channel selection. The display 52 enables the operator to check that the correct channel number was keyed. During the 101st state of counter 31, the operator selected channel number is fed via gate 94 to effect connection between the console and the selected channel data store. The display 53 then shows the measured input for this channel and displays 54 and 56 show the control data at present in the store of the selected channel. The extra monitor display 56 displays information such as integral time constant, derivative time constant, proportional band, sampling interval etc., as selected by a key of keys 58. Control data is changed by keying the required number on keys 50, checking that the correct number has been keyed from the monitor 61 and then transferring the data using a transfer key 59 and one of three selector keys 60 according to whether it is set-point information, output (for manual control) or other constant already selected by keys 58. The transfer is effected during the 101st state of connector 31 when the console is connected to data highway 92. The console also has a set of three keys 62 to select "automatic control", "manual control" or "hold". The manual control key enables the operator to effect manual control of any channel whilst the hold key causes the selected channel to have its output held by the aforementioned hold circuit 28. Three further keys 63 provide for normal operation, all manual or all hold, enabling the operator to cut-out the controller and to hold the outputs with manual override on all the channels as required. Indicators 64 provide for the indication of certain controller fault alarms, e.g. power supply failures, arithmetic check failure, or data transfer failure. Alarm levels may also be set for the input and output signals; these may be set in using the keyboard 50 and extra monitor 56. These alarms are conveniently indicator lamps (not shown) in a flow diagram representing the process under control. Audible or other alarms may also be provided.

It will be seen that the operator's console provides for the inputting of numerical data into the stores of the various channels are required for control purposes. The way this information and the input data relating to the process is utilised in the various control channels depends on the algorithm stores. The algorithms are selected using a pin-board and are not controlled from the console; it will be understood that for any given process, it would not normally be necessary to change the allocation of control algorithms once they have been selected. FIG. 5 shoes part of a diode matric pin-board 70 forming the channel the channel specification store. This pin-board has a series of rows corresponding to the various channels and has channel identification references and numbers in the two left hand columns 71, 72. In the algorithm section corresponding to matrix portion 49, there are three columns marked P, I and D. If, in any row, a pin is inserted in column P, a proportional term is introduced into the control loop for that channel. If a pin is inserted in the column I, an integral term is introduced into the control loop and if a pin is inserted in the column D, a derivative term is inserted in the control loop. The pin-board matrix selects only the algorithm to be applied to the control loop in this respect, the numerical constants being stored in the data stores of the various channels. The algorithm section 49 of the pin-board 70 also has columns enabling sum, difference, product and ratio terms to be used and also provides for lead-lag algorithms. The pin-board also has an interchannel link section 112 (FIG. 2) for making interchannel links using patch cords as shown for example at 73 (FIG. 5) for connecting an output column socket for one channel to an input column socket for another channel. The pin-board also has columns 74 for specifying alarms, columns 75 in the interval matrix portion 43 for controlling sampling intervals and columns for other control functions. The columns 75 constitute the inputs for signals SIM2 SIM4 etc. These signals are activated by plugging diode pins in the appropriate sockets in columns 75.

Figure 8:
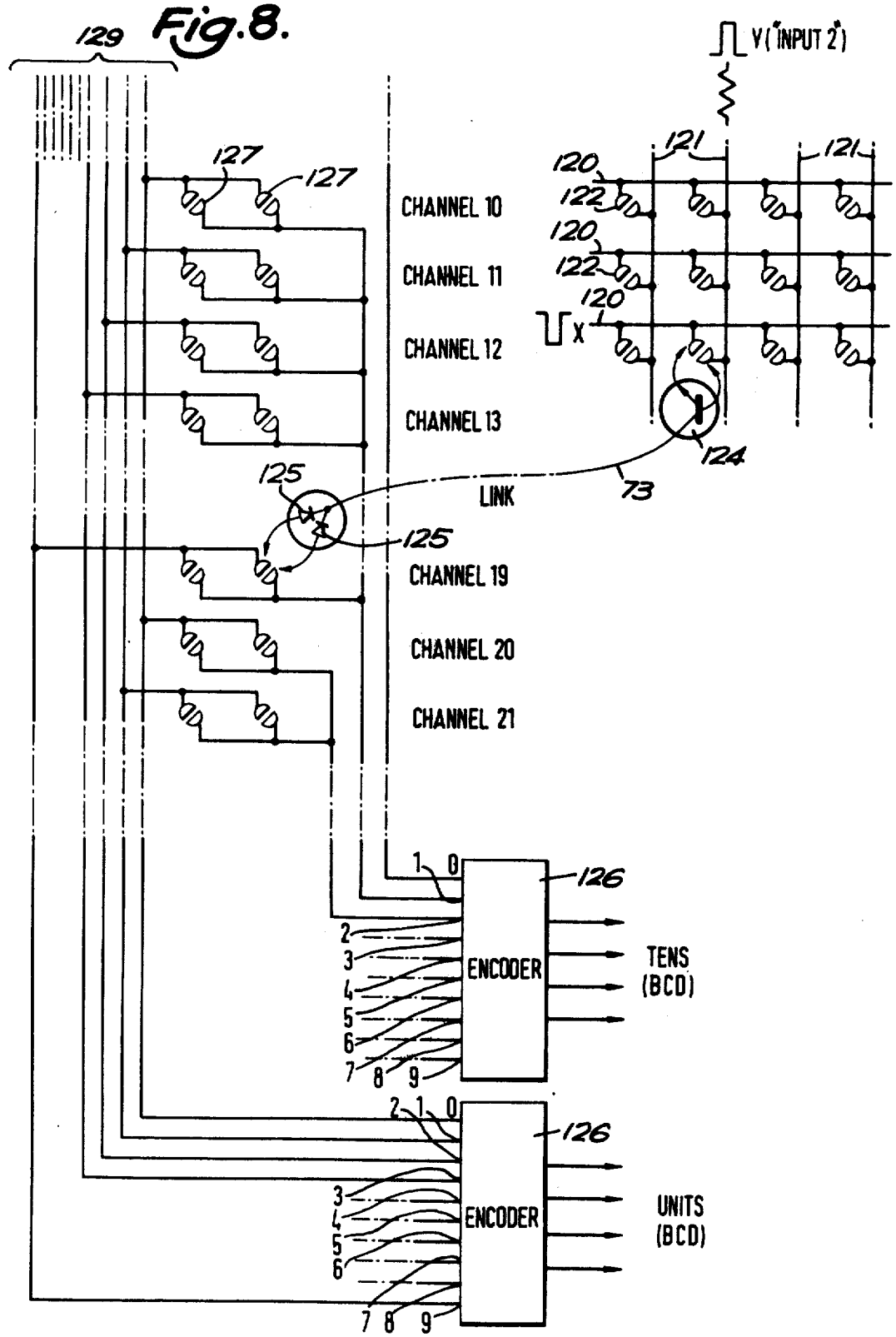
FIG. 8 is a diagram showing the method of operation of an inter-channel link section of a channel function matrix.

FIG. 8 illustrates the electrical circuit arrangement for effecting an interchannel link on the pin-board to permit of the automatic linking of the input or output of a channel for further use in another channel, instead of the normal inputs to that channel. Referring to FIG. 8, at the right hand side is shown an input matrix comprising X-conductors 120, 4 conductors 121 and sockets 122. Interchannel linking is achieved by using a link (73 in FIG. 5) containing a transistor 124 in one plug and two diodes 125 in the other. The right-hand (transistor) end of the link is energized by driving the transistor emitter low (by the channel number decoder, as for the rest of the matrix) and by driving the appropriate Y-conductor (and therefore the transistor base) high. This drive to the Y-conductor is under program control, and thus can be activated whenever the program is looking for a linked input. The two diodes at the left-hand end of the link both conduct when the transistor is turned on in this manner, activating one input of each of the two encoders 126 wired from the "source" sockets 127 as shown in FIG. 8. There are a pair of such sockets 127 for each channel so that, if required, two links 173 may be used to obtain data from that channel for processing. The source sockets are connected to leads 129 in a manner corresponding to the channel number. Thus the encoders 126 generate binary-coded-decimal versions of their single-wire channel number inputs, so the output of the encoders is a b.c.d. version of the channel number corresponding to the source end of the link. At such times, the channel number highway 92, to the channel data stores only, is switched by a switch 128 (FIG. 2) away from the channel number counter 31 and to this encoded "link source channel number" from encoders 126. The arithmetic unit can then collect data, via the data highway, from that channel's data store, as appropriate to the functions involved.

Figure 4:
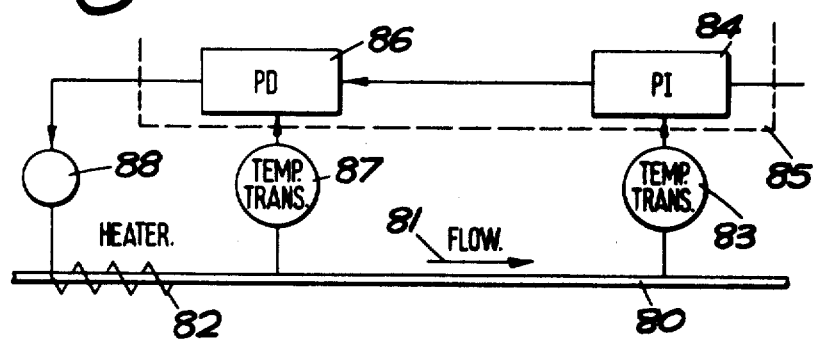
FIG. 4 is a diagram, for explanatory purposes, of a temperature control loop with cascade operation.

The use of the pin-board will be made clear by considering, as an example, the temperature control loop shown in FIG. 4 in which temperature of a fluid flow along a flow path 80 in the direction indicated by the arrow 81 is to be controlled using a heater 82. A temperature transmitter 83 provides a measured input to a first channel 84 of the controller 85. This channel provides proportional plus integral control with a setpoint defined by the operator and its output is used to provide the set-point for a second channel controller 86. This second channel obtains its measured input from a temperature transmitter 87 and provides proportional plus derivative control giving an output which is applied to a current-to-power converter 88 feeding the heater 82. FIG. 5 shows the setting up of the pin-board for this control. For the first channel, designated TC01 on the board, pins 90 are inserted in the proportional and integral columns of the algorithm section. For the second channel, designated TC02, pins 91 are inserted in the proportional and derivative columns. The link 73 connected to the source socket 127 of the first channel results in the address of the first channel being encoded by encoders 126. The presence of such a number operates switch 128 so that the number of the first channel is fed to the hybrid stores and thus the first channel data is fed to the arithmetic unit. The four input sockets 122 enable the operator to connect the output of the first channel to the appropriate input of the second channel (in this case the set-point input). It will be seen that the setting up of the required algorithms does not require any computer programming knowledge and can readily be done as soon as the control requirements are defined. The individual control channels can provide one, two or three term control. Cascade and feed forward connections can be effected and other algorithms can readily be provided.

As previously explained, the operator can set in set-point or other control data as required. The digital interface 50 may be used for setting a sequence of set-points from an external data source for programmed control or during start-up or shut-down of a process.

Figure 9:
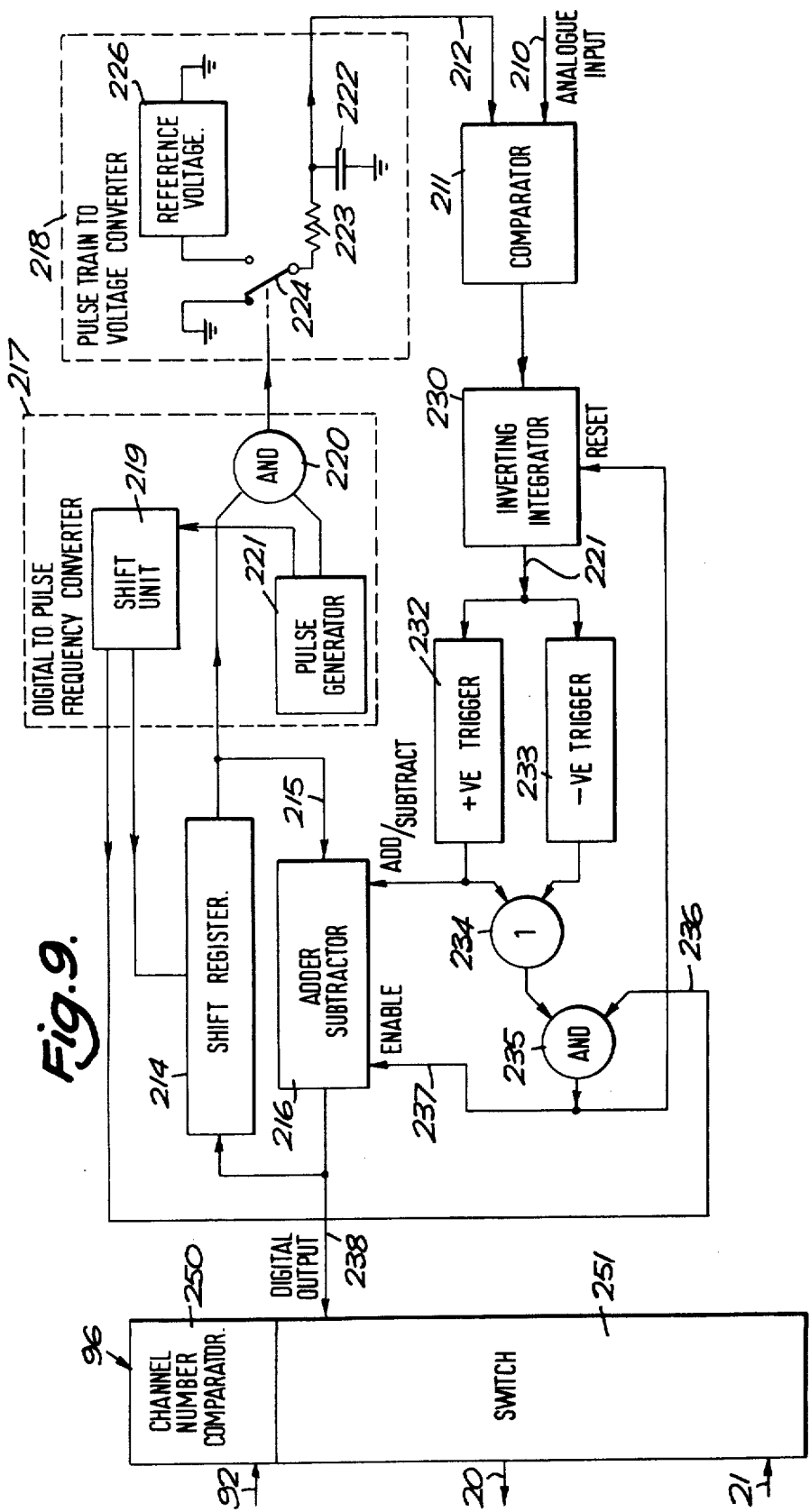
FIG. 9 illustrates a modification of part of FIG. 2.

FIG. 9 illustrates a modification of the arrangement of part of FIG. 2 in which instead of having a separate analogue to digital converter 25 used by the various channels on a time sharing basis, each channel incorporates its own converter. In FIG. 9, there is shown a preferred form of combined digital store and analogue-to-digital converter, particularly suitable for this purpose, which is described in U.S. Pat. application Ser. No. 283088 filed Aug. 23, 1972 and entitled "Analogue to Digital Converter", now U.S. Pat. No. 3,810,151.

Referring to FIG. 9, an input analogue voltage from one channel is applied on a lead 210 to an analogue comparator 211 which has a second analogue input on a lead 212. This second input is derived from a digital signal in a memory unit which, in the embodiment illustrated, is a shift register 214 with a recirculation loop 215 including an adder/subtractor 216. The digital signal in the shift register 214 is converted to analogue form by units 217 and 218 and applied to the comparator 211 via lead 212. In this particular embodiment the conversion is effected in two stages. The unit 217 makes use of the successive signals from the shift register, by shifting them at appropriate time intervals according to their significance, to provide a signal having a mark-to-space ratio representing the digital signal. This output is a pulse train having a mean frequency proportional to the digital number. The output from unit 217 is converted into an analogue voltage in unit 218. In the unit 217, the shifting of the signals in the shift register is effected by shift unit 219 (corresponding to unit 26 of FIG. 2) which steps the data in the shift register so that each digit remains on the last stage of the shift register 214 for a time duration corresponding to the significance of that digit. This output digit is combined in an AND gate 220 with regularly repetitive pulses from a pulse generator 221 which also synchronise the shift unit 219. A digital-to-pulse train converter, such as the converter 217, is described in the specification of the aforementioned U.S. Pat. No. 3,605,026. Other types of digital to pulse-frequency or digital to mark-space ratio converters are known and may be used. The pulse frequency output from unit 217 is converted to an analogue signal in unit 218 by an averaging circuit. This averaging circuit is illustrated diagrammatically as comprising a shunt capacitor 222 charged through a series resistor 223, the charging voltage being switched by a switch 224 controlled by the pulses from unit 217 so that the resistor 223 is connected to a voltage source 226 and to earth for periods of time corresponding to the mark to space ratio of the pulse train.

The output from the comparator 211 has a polarity depending on the sense of the difference of the two inputs on leads 210, 212. This output is fed to an inverting integrator 230 which is periodically reset by a signal on a lead 231. The integrator gives a sawtooth output of polarity depending on the sense of the input signal, which output is applied to both positive and negative trigger units 232, 233. Depending on the output polarity, one or other of these trigger units will be triggered when the integrator output reaches the trigger reference level. The outputs of the trigger units are fed via an OR gate 234 to one input of an AND gate 235. The second input to this AND gate 235 is a timing signal on a lead 236 from the shift circuit for the shift register 214 indicating when the least significant digit is being circulated through the adder/subtractor 216. The output from the AND gate 235 provides the reset pulse on lead 231 and is also applied on a lead 237 as an enabling pulse to the adder/subtractor 216 so that the latter adds or subtracts one unit according as to whether a signal is present or absent in the output from the positive trigger unit 232. Thus, in each recirculation cycle of the digital data in the shift register, if one of the trigger units 232, 233, has been triggered, the number will be increased or decreased by one. The digital number will remain unchanged if neither trigger unit has been triggered. The digital number is thus changed at a rate and in a sense which will depend on the magnitude and sense of the difference signal from the comparator 211 so as to make the digital number in the shift register correspond to the magnitude of the analogue input on lead 210. The digital output, in this embodiment, is taken out in serial form on a lead 238 from the recirculation loop 215.

The analogue-to-digital converter of FIG. 9 thus far described is used as part of the hybrid store such as hybrid store 22 of FIG. 2, the digital output on lead 238 being applied to a switching unit 96 comprising a channel number comparator 250 responsive to input channel number information in highway 92 and controlling a switch 251 to feed the digital information out on lead 20. Digital information from lead 21 may be fed into the same shift register 214 and converted to analogue form by a digital-to-analogue converter, the output of which is applied to the hold circuit 28. This digital-to-analogue converter may be similar to the units 217 and 218 but the shift unit 219, the pulse generator 221 and the reference voltage source 226 can be common for all the digital-to-analogue converters in all the channels.

I claim:

1. In a control system having a plurality of separate control channels and a common means for processing data from all said channels in digital form, each channel having an input line for receiving input analog information, an output line for output analog control signals, a digital store for storing input and output information, and converter means connected between said digital store and said input and output lines for converting analog and digital information to digital and analog information, respectively; sequencing means for connecting each of said control channels in sequence to said common data processing means, the data processing means including a multiplicity of control functions for use in processing said input information, the improvement comprising:
    a channel function specification pin-board matrix having rows of input lines, columns of output lines, and socket means for interconnecting individual rows and columns, each of said rows of inputs corresponding to one of said channels and each of said columns corresponding to one of said control functions;
    pin means manually insertable in selected ones of said sockets whereby said matrix is responsive to the connection of each of said channels to said common data processing means to cause the input data from the selected channel to be processed in accordance with the control function selected by said pin means.

2. A control system as claimed in claim 1 wherein the pin-board has, for each channel, sockets for selecting proportional, integral and derivative terms.

3. A control system as claimed in claim 1 wherein the pin-board has, for each channel, at least one output socket and at least one input socket and wherein patch-cords are provided for defining a connection from an output socket on the pin-board of one channel to an input socket of another channel.

4. A control system as claimed in claim 1 wherein there is provided battery-powered hold means operative, for each channel, to hold the analogue output information.

5. A control system as claimed in claim 1 wherein said channel specification matrix includes a sampling interval matrix connected to said sequencing means to be controlled thereby, and wherein means are provided controlled by the sampling interval matrix to determine the sampling interval for each channel.

6. A control system as claimed in claim 1 wherein said channel specification matrix includes a zero and span matrix controlled by said sequencing means and wherein there is provided a scaler controlled by the zero and span matrix operative to scale digital data from any selected channel for monitoring or for inputting control data.

7. In a control system for controlling a number of different variables in accordance with input information in different channels and having for each channel, an input line for input analogue information, an output line for output analogue control signals, a digital store for storing input and output digital data, an analogue to digital converter connected to said input line to connect input information to digital form, means for putting said input information in digital form into said digital store, a digital-to-analogue converter connected between said digital store and said output line for converting stored digital information into output analogue control signals, and common data processing equipment, the improvement comprising:
    the combination of an arithmetic unit, a channel sequencer providing channel number information for the various channels in sequence, a data highway between said digital stores and said arithmetic unit, switch means associated with the digital stores in each channel operatingly responsive to channel number information from said channel sequencer and operating when the appropriate channel member is received to connect that digital store for two-way communication with the arithmetic unit, a pin board channel function matrix connected to said sequencer to give output specifying functions to be performed on receipt of each channel number in sequence, said outputs being determined by the setting of plugs in said pin board and control logic and program store means connected to said channel function matrix to provide program control for said arithmetic unit, said control logic and program store being connected to said channel function matrix to be controlled in accordance with the pin setting on said pin board matrix.

8. In a control system having a plurality of separate control channels and a common means for processing data from all said channels in digital form, sequencing means for selecting and connecting each of said control channels in sequence to said common data processing means, the improvement comprising:
    an input line for each channel for receiving input analog information;
    an output line for each channel for output analog control signals;
    a digital store for storing input and output digital data;
    an analog to digital converter connected to said input line to convert input information to digital form;
    means for storing said input information in digital form in said digital store;

a digital to analog converter connected between said digital store and said output line for converting stored digital information into output analog control signals; and data processing equipment common to all of said channels for processing said stored digital information, said data processing equipment including a pin board channel function matrix having channel selecting rows, output function specifying columns, socket means at the intersections of said rows and columns, and pin means manually insertable in selected socket means to interconnect selected rows and columns to cause selected functions to be performed on said stored digital information for each channel in sequence, whereby the output for each channel is specified in accordance with the column location of said pin means said pin means providing a visual indication of the selected function.

9. The control system of claim 8 wherein said data processing equipment further includes a pin board inter-channel linking matrix having channel selecting rows, channel input and output columns, linking matrix socket means at the intersections of said channel rows and columns, and patch cord pin means manually insertable in selected socket means to interconnect the inputs and outputs of selected linking matrix channels, said patch cord means providing a visual indication of the selected interconnections.

10. The control system of claim 9, wherein said data processing equipment further includes a pin board sampling interval matrix having channel selecting rows, sampling interval columns, sampling interval socket means at the intersections of said channel selecting rows and sampling interval columns, and additional pin means manually insertable in selected sampling interval socket means to interconnect each selected channel to a selected sampling interval column; and an interval timing circuit connected to each sampling interval column, the selection of a channel by said sequencing means activating the interval timing circuit selected for that channel to produce a control action output signal to regulate the time intervals at which said selected output functions are performed on said stored digital information.

11. A method for automatic, independent digital control of a plurality of different variables on a time-shared basis in accordance with selected functions, comprising:

receiving in corresponding independent input-output channels analogue input data representing each of said variables;

converting said input data to digital form and storing said digital data in the corresponding input-output channel;

storing a plurality of selectable control functions for use in processing said stored data;

manually interconnecting each of said channels with at least one of said stored control functions;

automatically and sequentially selecting said channels;

shifting the stored digital data from the selected channel to common data processing means for processing in accordance with the control functions manually selected for the said selected channel;

shifting the processed digital data back to the selected input-output channel;

storing the processed digital data in its corresponding input-output channel; and converting said stored processed digital data to analog form for use in controlling said variable.

12. The method of claim 11, wherein the step of manually interconnecting said channels with said stored control functions comprises connecting each channel to a corresponding row of a pin board control function matrix;

connecting each of said stored control functions to a corresponding column of said pin board control function;

mechanically interconnecting selected rows and columns of said pin board matrix, whereby selected functions are activated for processing the digital data in specified channels, the mechanical interconnections providing a visual indication of the selected function.

* * * * *